United States Patent [19]
Venegas, Jr. et al.

[11] Patent Number: 5,261,647
[45] Date of Patent: Nov. 16, 1993

[54] GUARDRAIL ASSEMBLY

[75] Inventors: Frank Venegas, Jr., Howell; Wayne A. Damitz, Union Lake, both of Mich.

[73] Assignee: Ideal Steel and Builders' Supplies, Inc., Hamburg, Mich.

[21] Appl. No.: 772,687

[22] Filed: Oct. 7, 1991

[51] Int. Cl.$^5$ ............................................. E01F 15/00
[52] U.S. Cl. ................................... 256/131; 256/66; 256/19; 403/264
[58] Field of Search .................... 256/65–69, 256/59, 19, 13.1, DIG. 6, 1, 21, 22, 70, DIG. 5; 403/252, 258, 264, 247

[56] References Cited
U.S. PATENT DOCUMENTS

| | | |
|---|---|---|
| 1,452,875 | 4/1923 | Healy . |
| 2,117,798 | 5/1938 | Gascoigne et al. ............... 256/21 X |
| 2,603,455 | 7/1952 | Welch . |
| 2,780,440 | 2/1957 | Krieger ............................ 256/85 X |
| 2,927,513 | 3/1960 | Dove . |
| 2,946,568 | 7/1960 | Ogden . |
| 3,028,148 | 4/1962 | Crannell ............................ 256/13.1 |
| 3,239,196 | 3/1966 | Blum et al. ......................... 256/67 |
| 3,776,520 | 12/1973 | Charles et al. . |
| 3,963,218 | 6/1976 | Glaesener . |
| 4,074,893 | 2/1978 | Colfrin ............................... 256/21 |
| 4,461,461 | 7/1984 | Caron . |
| 4,466,600 | 8/1984 | Tuttle ................................ 256/65 |
| 4,516,756 | 5/1985 | Beatty . |
| 4,540,160 | 9/1985 | Zanavich et al. . |
| 4,702,459 | 10/1987 | Moschner . |
| 4,718,789 | 1/1988 | Kuenen ........................... 403/264 X |
| 4,892,292 | 1/1990 | Russell . |
| 4,930,754 | 6/1990 | Caron et al. . |
| 4,953,830 | 9/1990 | Weaver, III . |
| 5,141,207 | 8/1992 | Meglino et al. ................... 256/65 X |

FOREIGN PATENT DOCUMENTS 2156528  5/1973  Fed. Rep. of Germany ........ 256/21

OTHER PUBLICATIONS

Drawing specification for a modular rail system by the Spiratex Company, Feb. 11, 1991.

Primary Examiner—Randolph A. Reese
Assistant Examiner—Harry C. Kim
Attorney, Agent, or Firm—Price, Heneveld, Cooper, DeWitt & Litton

[57] ABSTRACT

The guardrail assembly includes at least one tubular metal stanchion, having a base and an extendable/retractable setscrew, and at least a horizontal top rail. The horizontal top rail has an inner metal pipe, an outer plastic pipe, and at least one aperture for receiving the metal stanchion. Prior to assemblage, the setscrew is retracted inside the tubular stanchion. Prior to insertion of the stanchion into the aperture, at least one tubular plastic sheath, having a first end conforming with the base of the stanchion and a second end conforming with the top horizontal rail, is slipped onto the tubular metal stanchion. Following placement of the top horizontal rail atop the stanchion, the sheath rests on the base of the stanchion and engages the top horizontal rail. The top of the stanchion or the sheath are capable of supporting the top horizontal rail. The top horizontal rail is locked in position atop the stanchion by extension of the setscrew. Disassemblage of the guardrail assembly is facilitated by the easily retracted setscrew.

30 Claims, 4 Drawing Sheets

GUARDRAIL ASSEMBLY

BACKGROUND OF THE INVENTION

This invention generally relates to a guardrail and, more particularly, to a unique rigid guardrail assembly which can be quickly installed, dismantled, moved and reassembled, in factories, parking lots, stadiums, stairways, porches, balconies and the like.

Steel guardrails are commonly used in factories and warehouses to direct forklift traffic and to protect machinery from being hit by forklifts or other potentially damaging objects present in factories and warehouses. While steel guardrails are quite strong, they also generally are quite rigid and, therefore, do not possess high energy absorbing capabilities. Another disadvantage of steel guardrails is that they require maintenance because they rust. An alternative to steel guardrails are plastic guardrails which, as compared with steel guardrails, can be energy absorbing, are low maintenance, and also have the advantage of being easily color-coded. Unfortunately, plastic guardrails do not provide the same strength that is a desirable characteristic of steel guardrails. Therefore, it would be highly desirable to have available guardrails which combine the respective desirable characteristics of plastic and steel guardrails.

A common drawback to many currently available steel, plastic or steel/plastic guardrail assemblies is that once they are assembled in one place, they essentially become fixtures in that location. Hence, although such guardrail assemblies are common, they are not easily removed from one location and reassembled in another location. As a result, there exists a need for an improved guardrail assembly which combines the desirable characteristics of plastic and steel guardrail assemblies, yet allows the ready assemblage and disassemblage of such a guardrail assembly.

SUMMARY OF THE INVENTION

The present invention provides a knockdown guardrail assembly which is readily and easily assembled and disassembled. The guardrail assembly includes at least one vertically oriented support stanchion having a tubular metal post and a base where a lower end of the post is anchored to the base and an upper end of the post has an extendable/retractable setscrew. A top horizontal rail having an inner metal pipe, an outer plastic pipe, and at least one aperture through one side of the rail for receiving the stanchion post is removably positioned on top of the stanchion post to a point just beyond the setscrew and is locked in place by the extension of the setscrew. Prior to the positioning of the top horizontal rail, the setscrew is retracted into the stanchion post and at least one plastic tubular sheath having a first end conforming with the base, a second end conforming with the top horizontal rail, is slipped over the exterior surface of the stanchion post. The sheath is designed to rest on the base of the stanchion and to engage the top horizontal rail. The stanchion post, the sheath, or both provide support to the top horizontal rail. The guardrail assembly is disassembled by retracting the setscrew and removing the above components.

In an alternative embodiment, a first horizontal rail similar in composition to the top horizontal rail is added to the guardrail assembly prior to addition of the top horizontal rail, the first horizontal rail having at least one aperture through both sides of its constituent steel inner pipe and plastic outer pipe. A first plastic tubular sheath having a first end conforming with the base and a second end conforming with the first horizontal rail is slid onto the stanchion post to support the first horizontal rail. A second plastic tubular sheath having a first end conforming with the first horizontal rail and a second end conforming with the top horizontal rail is then slipped over the stanchion post. The second sheath rests on the first horizontal rail and engages the top horizontal rail. The stanchion post, the second sheath, or both provide support to the top horizontal rail. The setscrew is then extended to lock the top horizontal rail into position atop the stanchion post.

In other preferred embodiments, a plurality of stanchions, sheaths and horizontal rails can be used. These and other objects, advantages and features of this invention will become apparent upon review of the following specification in conjunction with the drawings.

DETAILED DESCRIPTION OF THE PREFERRED EMBODIMENTS

Figure 1:
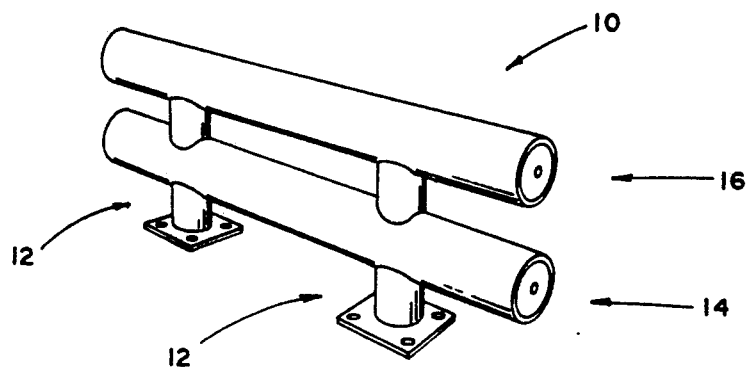
FIG. 1 is a perspective view of the guardrail assembly of the present invention.
Figure 2:
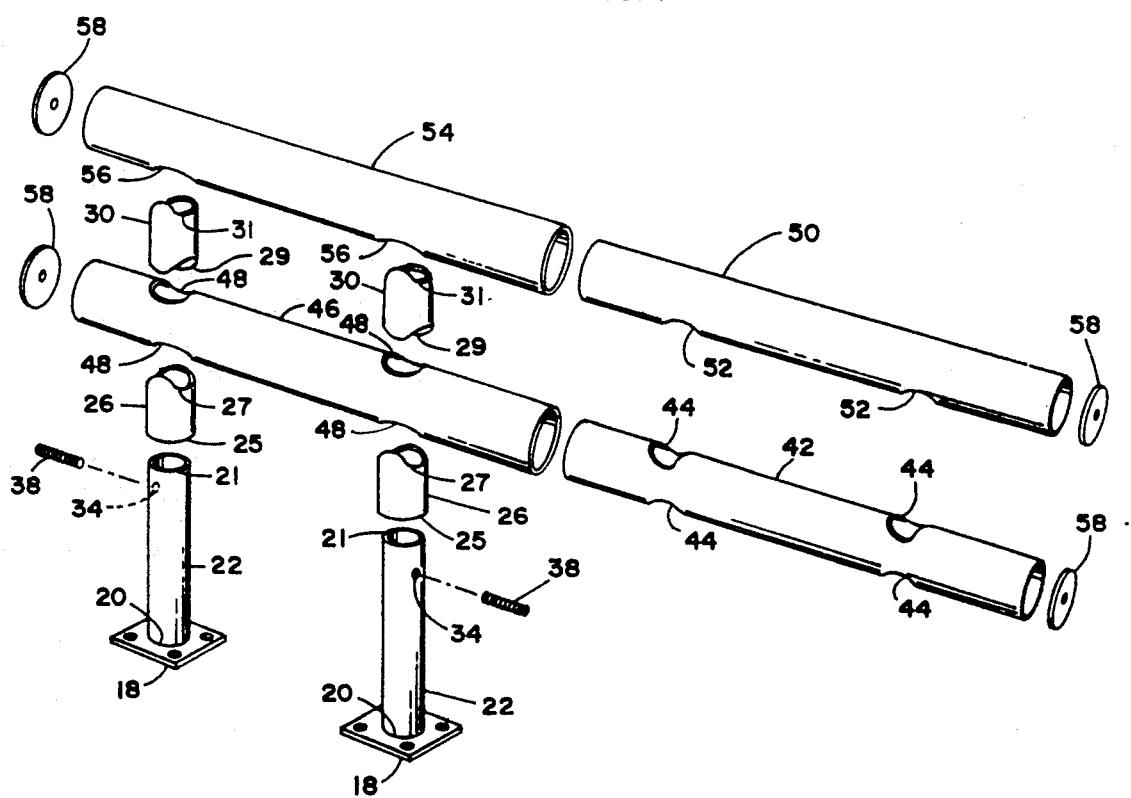
FIG. 2 is an exploded view of the guardrail assembly of the present invention.

Referring now to the drawings and the embodiments illustrated therein, in which like numerals indicate like parts throughout the several views, FIG. 1 shows a guardrail assembly 10 including a plurality of upright stanchions 12, a first horizontal rail 14 and a horizontal top rail 16. As shown in FIG. 2, the plurality of upright stanchions 12 each include a base 18, a tubular metal post 22 having a lower end 20 and an upper end 21, a first tubular sheath 26, a second tubular sheath 30, an aperture 34 and an extendable/retractable setscrew 38. As shown in FIG. 2, first horizontal rail 14 includes a first metal pipe 42 having a plurality of apertures 44, and a first plastic pipe 46 having a plurality of apertures 48. Horizontal top rail 16 (FIG. 2) includes a top metal pipe 50 having a plurality of apertures 52 and a top plastic pipe 54 having a plurality of apertures 56.

The first step in the assemblage of guardrail assembly 10 is bolting base 18 of stanchion 12 into the ground, i.e., concrete with a plurality of bolts 19. The preferred expandable bolt for the installation is the RAWL-BOLT TM available from The Rawl Plug Company, Inc., Two F.B. Powers Square, New Rochelle, N.Y. Installation involves the use of a hammer drill to drill holes in the concrete. Base 18 is then positioned over the holes and expandable bolts 19 are then driven into the holes by the hammer drill. A crescent or socket wrench is then used to tighten bolts 19. Following the proper positioning of stanchion post 22, the guardrail assembly of the present invention can be assembled.

Figure 4:
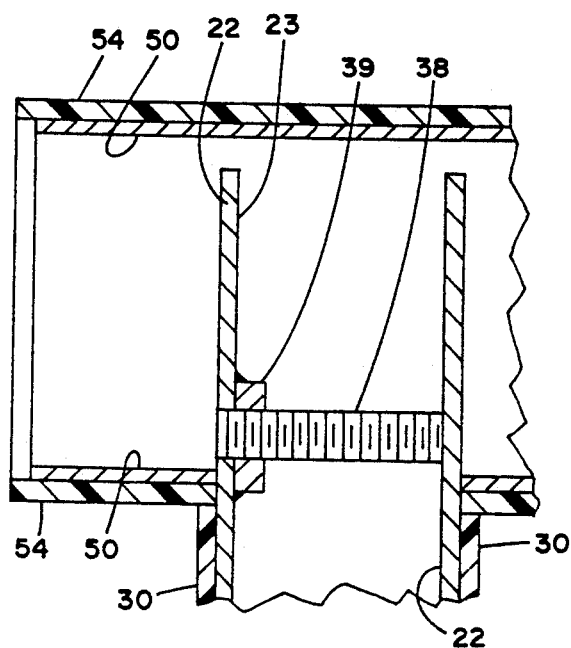
FIG. 4 is a cross-sectional view of the locking mechanism of the present invention showing the setscrew in the unlocked position.

With reference to FIGS. 2 and 4, guardrail assembly 10 is assembled by first retracting setscrew 38 into post 22. First sheath 26 then is slid onto post 22. Sheath 26 has a first end 25 conforming with base 18, a second end 27 conforming with first horizontal rail 14 and has interior dimensions which are greater than or equal to the exterior dimensions of post 22. After sheath 26 is slid onto post 22, first end 25 rests on base 18 of stanchion 12.

First horizontal rail 14 is formed by locating first metal pipe 42 in first plastic pipe 46. The plurality of apertures 44 of first metal pipe 42 are aligned with the plurality of apertures 48 of first plastic pipe 46 to allow the fitting of stanchion post 22 through the aligned apertures and the placement of first horizontal rail 14 onto stanchion post 22. After placement of first horizontal rail 14 onto stanchion post 22, second end 27 of first sheath 26 engages first horizontal rail 14 and first sheath 26 provides support for first horizontal rail 14.

Second sheath 30 has a lower end 29 conforming with first horizontal rail 14, an upper end 31 conforming with top horizontal rail 16, and has interior dimensions which are greater than or equal to the exterior dimensions of post 22. After sheath 30 is slipped onto post 22, lower end 29 rests on first horizontal rail 14.

Top metal pipe 50 is then inserted into top plastic pipe 54 to form top horizontal rail 16. The plurality of apertures 52 of top metal pipe 50 are then aligned with the plurality of apertures 56 of top plastic pipe 54. This alignment of apertures 52 with apertures 56 allows stanchion post 22 to be fitted into said aligned apertures and allows the positioning of top horizontal rail 16 onto stanchion post 22.

Figure 3:
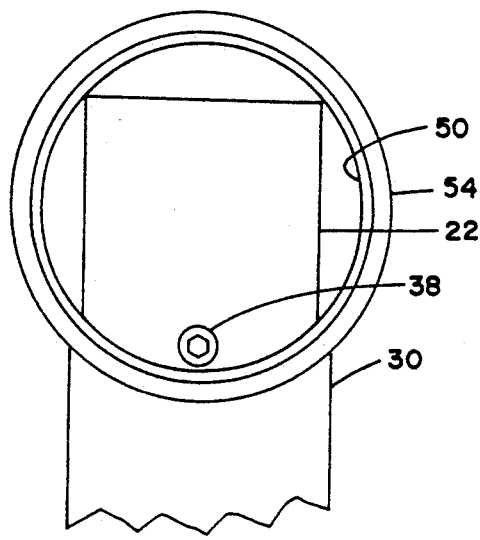
FIG. 3 is an end view of the top horizontal rail of the present invention showing the setscrew locking mechanism of the present invention.
Figure 5:
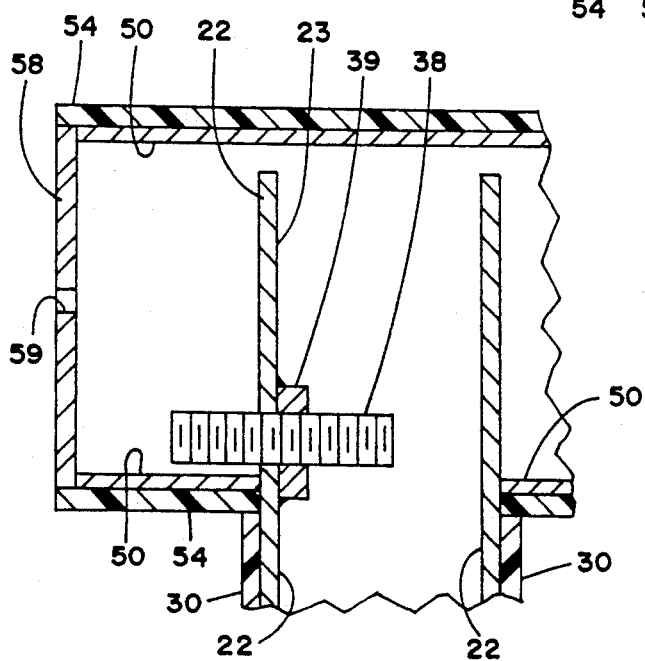
FIG. 5 is a cross-sectional view of the locking mechanism of the present invention showing the setscrew in the locked position.

In a first embodiment, upper end 31 of second sheath 30 engages top horizontal rail 16 and sheath 30 provides support for top horizontal rail 16 (FIGS. 4 and 5). Alternatively, as shown in FIG. 3, upper end 21 of post 22 engages the interior surface of top metal pipe 50 to provide support for top horizontal rail 16. In this embodiment, upper end 31 of sheath 30 engages top horizontal rail 16, but does not provide support for top horizontal rail 16. It is possible, however, that the parts of stanchion 12 could be cut so precisely that both upper end 21 of post 22, and sheath 30 provide support for top horizontal rail 16.

Upon completion of the assemblage of guardrail assembly 10, setscrew 38 remains accessible from outside of top horizontal rail 16. A rake having an Allen wrench head is inserted into top horizontal rail 16 to extend setscrew 38. FIG. 4 illustrates setscrew 38 in its retracted position. FIG. 5 illustrates setscrew 38 in its extended position.

FIGS. 4 and 5 illustrate one embodiment where setscrew 38 is held in position by a nut 39 welded to an interior side 23 of post 22 surrounding aperture 34. Alternatively, aperture 34 can be threaded to accept setscrew 38, thus dispensing with the need for nut 39.

Regardless of the means used to hold setscrew 38 in position in aperture 34, it is preferred that setscrew 38, when fully retracted into post 22, abut the interior side of post 22 opposite aperture 34 (see FIG. 4). This prevents screw 38 from falling down into the bottom of post 22 when screw 38 is fully retracted. In addition, while it is contemplated that setscrew 38 can be extended and retracted by a number of devices, it is preferred that setscrew 38 be extended and retracted by an Allen wrench having a long bit to facilitate rotation of the setscrew inside top horizontal rail 16. Therefore, setscrew 38 would have a head similar to the head shown in FIG. 3 which allows rotation of setscrew 38 by an Allen wrench.

FIGS. 4 and 5 also illustrate that setscrew 38 is not in contact with top horizontal metal pipe 50. While this is not a requirement, having an amount of space between setscrew 38 and top metal pipe 50 allows top horizontal rail 16 the opportunity to move slightly or "give" upon being struck by an object. This allows guardrail assembly 10 of the present invention to have some shock absorbing attributes that typical steel guardrails do not have. These attributes are in addition to the energy absorbing characteristics contributed to guardrail assembly 10 by the use of the plastic pipe over the metal pipe.

Following the assemblage of guardrail assembly 10, a plurality of endcaps 58 may be used to cover the open ends of first horizontal rail 14 and top horizontal rail 16. In the preferred embodiment of the present invention, first plastic pipe 46 and top plastic pipe 54 are slightly longer than first metal pipe 42 and top metal pipe 50. The resulting overlap of first plastic pipe 46 and top plastic pipe 54 over first metal pipe 42 and top metal pipe 50 creates a space at the end of first horizontal rail top 14 and top horizontal 16 to receive endcaps 58. Because endcaps 58 are sized essentially to equal the interior dimensions of first plastic pipe 46 and top plastic pipe 54, endcaps 58 can be fitted to that space. FIG. 5 illustrates this positioning of endcap 58 abutting top metal pipe 50 and fitted within top plastic pipe 54. Endcaps 58 contain an aperture 59 to facilitate their removal.

Guardrail assembly 10 of the present invention is strong enough to become a permanent fixture where it is erected. There are instances, however, when it would be beneficial to be able to move or remove a guardrail. Removal of the present guardrail assembly 10 simply involves the reversal of the above listed assemblage steps. Specifically, endcaps 58, if present, are pried loose and setscrew 38 is retracted. Top horizontal rail 16, second sheath 30, first horizontal rail 14 and first sheath 26 can then be quickly and easily removed. Stanchion base 18 is then removed by untightening bolts 19 which are holding base 18 in the ground. These parts can then be moved to another location where guardrail assembly 10 can be reassembled quickly and easily. The only new parts required are the expandable bolts 19. Where repair of a portion of guardrail assembly 10 is required, it is not always necessary to remove the bolts from the ground. The knockdown characteristics of the present invention facilitate the quick and easy maintenance of the damaged portion.

Figure 6:
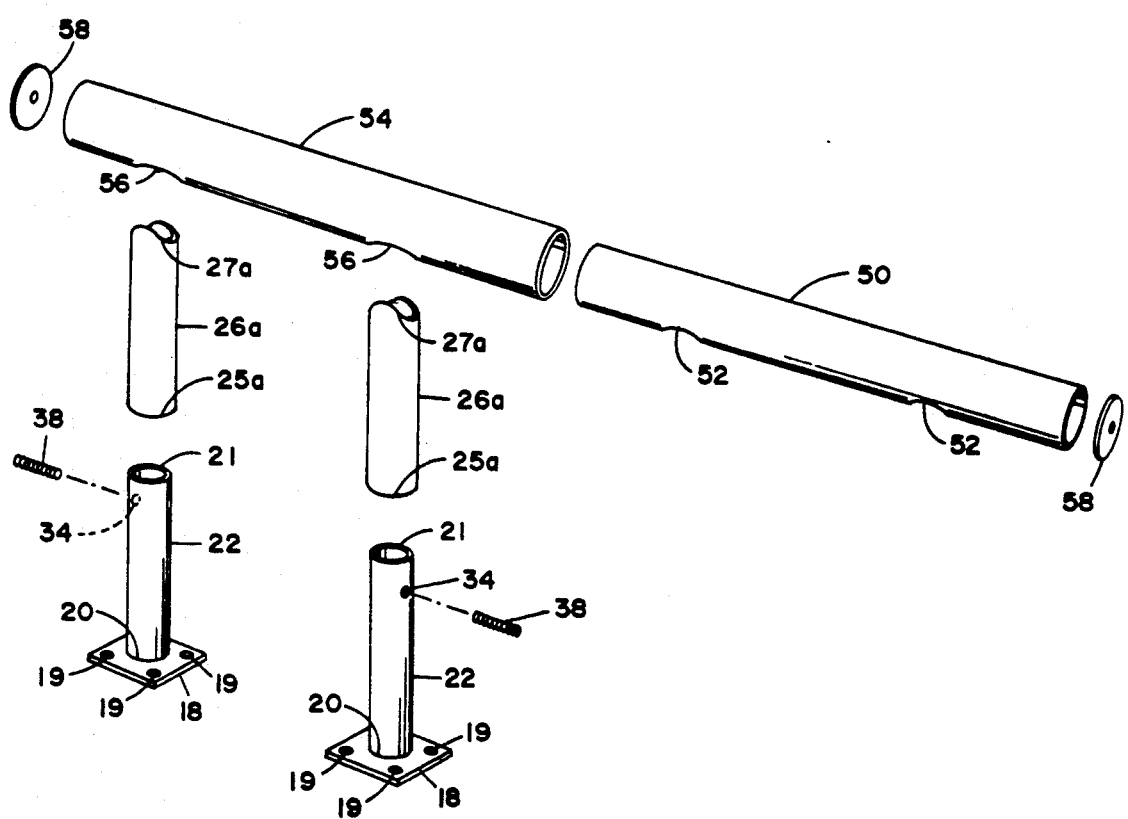
FIG. 6 is an exploded view of a second embodiment of the guardrail of the present invention.
Figure 7:
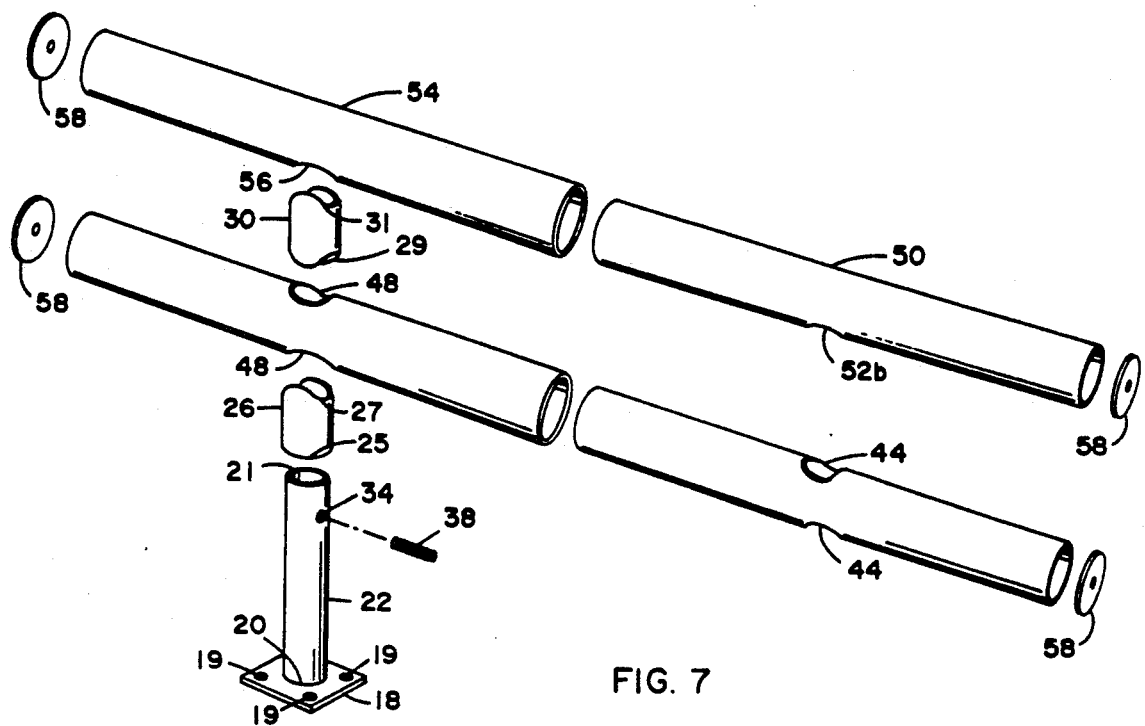
FIG. 7 is an exploded view of a third embodiment of the guardrail of the present invention.
Figure 8:
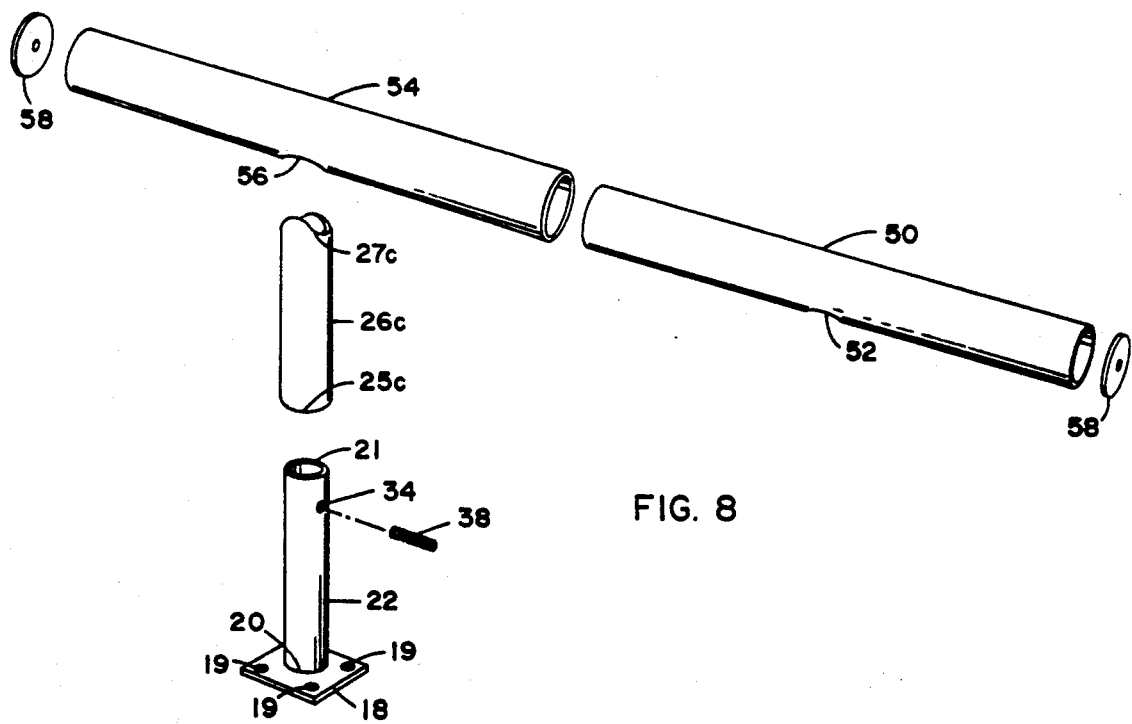
FIG. 8 is an exploded view of a fourth embodiment of the guardrail of the present invention.

Alternative embodiments of the present invention are illustrated in FIGS. 6, 7 and 8. As shown in FIG. 6, guardrail assembly 10 may involve the use of only the top horizontal rail 16. In this embodiment, base 18 is still bolted down with a plurality of bolts 19. Following retraction of setscrew 38 into post 22, a first sheath 26a is slid onto post 22 and rests on base 18. Sheath 26a is an elongated version of first sheath 26 and has first end 25 which conforms with base 18 and has interior dimensions which are greater than or equal to the exterior dimensions of post 22. Sheath 26a also has a second end 27a which conforms with the shape of top horizontal rail 16.

Top metal pipe 50 is inserted into top plastic pipe 54 to form top horizontal rail 16. The plurality of apertures 52 of top metal pipe 50 are then aligned with the plurality of apertures 56 of top plastic pipe 54. This alignment of apertures 52 with apertures 56 allows stanchion post 22 to be fitted into said aligned apertures and allows the positioning of top horizontal rail 16 onto stanchion post 22. As in the embodiment depicted in FIGS. 3, 4 and 5, top horizontal rail 16 can be supported either by sheath 26a or by post 22, or by a combination of both. Regardless of the means of support, however, upper end 27a of sheath 26a engages top horizontal rail 16.

As shown in FIG. 7, guardrail assembly 10 may involve the use of a plurality of horizontal rails and only a single stanchion 12. In this embodiment, base 18 is still bolted down with a plurality of bolts 19. Following retraction of setscrew 38 into post 22, first sheath 26 then is slid onto post 22. Sheath 26 has a first end 25 conforming with base 18, a second end 27 conforming with the shape of first horizontal rail 14 and has interior dimensions which are greater than or equal to the exterior dimensions of post 22. After sheath 26 is slid onto post 22, first end 25 rests on with base 18 of stanchion 12.

First horizontal rail 14 is formed by locating first metal pipe 42 in first plastic pipe 46. A single aperture 44 of first metal pipe 42 is aligned with a single aperture 48 of first plastic pipe 46 to allow the fitting of stanchion post 22 through the aligned apertures and the placement of first horizontal rail 14 onto stanchion post 22. After placement of first horizontal rail 14 onto stanchion post 22, second end 27 of first sheath 26 engages first horizontal rail 14 and first sheath 26 provides support for first horizontal rail 14.

Second sheath 30 has a lower end 29 conforming with the shape of first horizontal rail 14, an upper end 31 conforming with the shape of top horizontal rail 16, and has interior dimensions which are greater than or equal to the exterior dimensions of post 22. After sheath 30 is slipped onto post 22, lower end 31 rests on first horizontal rail 14. Top metal pipe 50 is then inserted into top plastic pipe 54 to form top horizontal rail 16. A single aperture 52 of top metal pipe 50 is then aligned with a single aperture 56 of top plastic pipe 54. This alignment of aperture 52 with aperture 56 allows stanchion post 22 to be fitted into said aligned apertures and allows the positioning of top horizontal rail 16 onto stanchion post 22. As in the embodiment depicted in FIGS. 3, 4 and 5, top horizontal rail 16 can be supported either by second sheath 30 or by post 22, or by a combination of both. Regardless of the means of support, however, upper end 31 of second sheath 30 engages top horizontal rail 16.

As shown in FIG. 8, guardrail assembly 10 may involve the use of only the top horizontal rail 16 and a single stanchion 12. In this embodiment, base 18 is still bolted down with a plurality of bolts 19. Following retraction of setscrew 38 into post 22, a first sheath 26c is slid onto post 22 and rests on base 18. Sheath 26c is an elongated version of first sheath 26 and has first end 25 conforming base 18 and has interior dimensions which are greater than or equal to the exterior dimensions of post 22. Sheath 26c, however, has a second end 27c which conforms with the shape of top horizontal rail 16.

Top metal pipe 50 is inserted into top plastic pipe 54 to form top horizontal rail 16. A single aperture 52 of top metal pipe 50 is then aligned with a single aperture 56 of top plastic pipe 54. This alignment of aperture 52 with aperture 56 allows stanchion post 22 to be fitted into said aligned apertures and allows the positioning of top horizontal rail 16 onto stanchion post 22. As in the embodiment depicted in FIGS. 3, 4, 5 and 6, top horizontal rail 16 can be supported either by sheath 26c or by post 22, or by a combination of both. Regardless of the means of support, however, upper end 27c of sheath 26c engages top horizontal rail 16.

With respect to the preferred materials for use in the present invention, it is preferred that the top and first plastic pipes and the plastic sheaths be formed from high density polyethylene. Regarding the first and top metal pipes, and the stanchion posts and bases, it is preferred that they be formed from a metal selected from the group including steel, aluminum, and iron.

The above description is considered that of the preferred embodiment only. Modifications of the invention may occur to those of ordinary skill in the art. Therefore, it is understood that the embodiment shown in the drawings and described above is merely for illustrative purposes and is not intended to limit the scope of the invention, which is defined by the following claims as interpreted according to the principles of patent law.

The embodiments of the invention in which an exclusive property or privilege is claimed are defined as followed.

1. A knockdown guardrail assembly comprising:
  at least one vertically oriented support stanchion, said stanchion including a base and a tubular metal post having a lower end and an upper end, said tubular metal post further having an inside dimension, an outside dimension and an exterior surface, said lower post end anchored to said base and said upper post end having an extendable/retractable setscrew;
  a top horizontal rail having a hollow interior, said top horizontal rail having a top plastic pipe and a top metal pipe, said top plastic pipe having an inside dimension and an outside dimension, said top metal pipe having an outside dimension less than or equal to said inside dimension of said top plastic pipe, said top plastic pipe having at least one aperture through one side of said top plastic pipe, said top metal pipe having at least one aperture through one side of said top metal pipe, said top metal pipe being located in said top plastic pipe such that said apertures in said respective pipes align with each other to allow fitting of said stanchion post into said aligned apertures whereby said stanchion post enters said aligned apertures to a point just beyond said setscrew so that said setscrew remains accessible from outside of said top horizontal rail through said hollow interior of said top horizontal rail for extension and retraction of said setscrew after placement of said top horizontal rail on said stanchion to hold said top horizontal rail in position on said stanchion; and
  at least one hollow plastic tubular sheath having a first end on said base, a second end engaging said top horizontal rail, and having interior dimensions which are greater than or equal to said outside dimension of said stanchion post such that said sheath can be slipped over and surround said exterior surface of said stanchion post below said setscrew.

2. A guardrail assembly in accordance with claim 1 wherein said stanchion post supports said top horizontal rail.

3. A guardrail assembly in accordance with claim 2 wherein said setscrew is positioned in said stanchion post by a threaded nut attached to the interior of said stanchion post.

4. A guardrail assembly in accordance with claim 3 wherein said top plastic pipe and said plastic sheath are formed from high density polyethylene.

5. A guardrail assembly in accordance with claim 4 wherein said top metal pipe, said stanchion post and said stanchion base are formed from a metal selected from the group including steel, aluminum, and iron.

6. A guardrail assembly in accordance with claim 1 wherein said sheath supports said top horizontal rail.

7. A guardrail assembly in accordance with claim 6 wherein said stanchion post is threaded for receiving said setscrew.

8. A guardrail assembly in accordance with claim 7 wherein said top plastic pipe and said plastic sheath are formed from high density polyethylene.

9. A guardrail assembly in accordance with claim 8 wherein said top metal pipe, said stanchion post and said stanchion base are formed from a metal selected from the group including steel, aluminum, and iron.

10. A knockdown guardrail assembly comprising:
at least one vertically oriented support stanchion, said stanchion including a base and a tubular metal post having a lower end and an upper end, said tubular metal post further having an inside dimension, an outside dimension and an exterior surface, said lower post end anchored to said base and said upper post end having an extendable/retractable setscrew;
a first horizontal rail having a first plastic pipe and a first metal pipe, said first plastic pipe having an inside dimension and an outside dimension, said first metal pipe having an outside dimension less than or equal to said inside dimension of said first plastic pipe, said first plastic pipe having at least one aperture through both sides of said first plastic pipe, said first metal pipe having at least one aperture through both sides of said first metal pipe, said first metal pipe being located in said first plastic pipe such that said apertures in said respective pipes align with each other to allow fitting of said stanchion post through said aligned apertures of said first horizontal rail and placement of said first horizontal rail onto said stanchion post;
at least one first hollow plastic tubular sheath having a first end on said base, a second end engaging said first horizontal rail, and having interior dimensions which are greater than or equal to said outside dimension of said stanchion post such that said first sheath can be slid over and surround said exterior surface of said stanchion post and support said first horizontal rail;
a top horizontal rail having a hollow interior, said top horizontal rail having a top plastic pipe and a top metal pipe, said top plastic pipe having an inside dimension and an outside dimension, said top metal pipe having an outside dimension less than or equal to said inside dimension of said top plastic pipe, said top plastic pipe having at least one aperture through one side of said top plastic pipe, said top metal pipe having at least one aperture through one side of said top metal pipe, said top metal pipe being inserted in said top plastic pipe such that said apertures in said respective pipes align with each other to allow fitting of said stanchion post into said aligned apertures of said top horizontal rail to a point just beyond said setscrew so that said setscrew remains accessible from outside of said top horizontal rail through said hollow interior of said top horizontal rail for extension and retraction of said setscrew after placement of said top horizontal rail on said stanchion to hold said top horizontal rail in position on said stanchion; and
at least one second hollow plastic tubular sheath having a first end on said top first horizontal rail, a second end engaging said top horizontal rail, and having interior dimensions which are greater than or equal to said outside dimension of said stanchion post such that said second sheath can be slipped over and surround said exterior surface of said stanchion post below said setscrew.

11. A guardrail assembly in accordance with claim 10 wherein said stanchion post supports said top horizontal rail.

12. A guardrail assembly in accordance with claim 11 wherein said setscrew is positioned in said stanchion post by a threaded nut attached to the interior of said stanchion post.

13. A guardrail assembly in accordance with claim 12 wherein said top plastic pipe and said plastic sheaths are formed from high density polyethylene.

14. A guardrail assembly in accordance with claim 13 wherein said top metal pipe, said stanchion post and said stanchion base are formed from a metal selected from the group including steel, aluminum, and iron.

15. A guardrail assembly in accordance with claim 10 wherein said sheath supports said top horizontal rail.

16. A guardrail assembly in accordance with claim 15 wherein said stanchion post is threaded for receiving said setscrew.

17. A guardrail assembly in accordance with claim 16 wherein said top plastic pipe and said plastic sheaths are formed from high density polyethylene.

18. A guardrail assembly in accordance with claim 17 wherein said top metal pipe, said first metal pipe and said stanchion post and bases are formed from a metal selected from the group including steel, aluminum, and iron.

19. A knockdown guardrail assembly comprising:
a pair of spaced apart, vertically oriented support stanchions, said stanchions including a base and a tubular metal post having a lower end and an upper end, said tubular metal post further having an inside dimension, an outside dimension and an exterior surface, wherein said lower post end is anchored to said base and said upper post end has an extendable/retractable setscrew;
a first horizontal rail having a first plastic pipe and a first metal pipe, said first plastic pipe having an inside dimension and an outside dimension, said first metal pipe having an outside dimension less than or equal to said inside dimension of said first plastic pipe, said first plastic pipe having a pair of parallel apertures through both sides of said first plastic pipe, said first metal pipe having a pair of parallel apertures through both sides of said first metal pipe, said first metal pipe being located in said first plastic pipe such that said apertures in said respective pipes align with each other to allow fitting of said stanchion posts through said aligned apertures of said first horizontal rail and placement of said first horizontal rail onto said stanchion posts;

a pair of first hollow plastic tubular sheaths having a first end on said base, a second end engaging said first horizontal rail, and having interior dimensions which are greater than or equal to said outside dimension of said stanchion posts such that said first sheaths can be slid over and surround said exterior surface of said stanchion posts and support said first horizontal rail;

a top horizontal rail having a hollow interior, said top horizontal rail having a top plastic pipe and a top metal pipe, said top plastic pipe having an inside dimension and an outside dimension, said top metal pipe having an outside dimension less than or equal to said inside dimension of said top plastic pipe, said top plastic pipe having a pair of parallel apertures through one side of said top plastic pipe, said top metal pipe having a pair of parallel apertures through one side of said top metal pipe, said top metal pipe being inserted in said top plastic pipe such that said apertures in said respective pipes align with each other to allow fitting of said stanchion posts into said aligned apertures of said top horizontal rail to a point just beyond said setscrew so that said setscrew remains accessible from outside of said top horizontal rail through said hollow interior of said top horizontal rail for extension and retraction of said setscrew after placement of said top horizontal rail on said pair of stanchions to hold said top horizontal rail in position on said stanchions; and a pair of second hollow plastic tubular sheaths having a first end on said first horizontal rail, a second end engaging said top horizontal rail, and having interior dimensions which are greater than or equal to said outside dimension of said stanchion posts such that said second sheaths can be slipped over and surround said exterior surface of said stanchion posts below said setscrew.

20. A guardrail assembly in accordance with claim 19 wherein said stanchion posts support said top horizontal rail.

21. A guardrail assembly in accordance with claim 20 wherein said setscrews are positioned in said stanchion posts by a threaded nut attached to the interior of said stanchion posts.

22. A guardrail assembly in accordance with claim 21 wherein said top plastic pipe and said first and second plastic sheaths are formed from high density polyethylene.

23. A guardrail assembly in accordance with claim 22 wherein said top metal pipe, said stanchion posts and said stanchion bases are formed from a metal selected from the group including steel, aluminum, and iron.

24. A guardrail assembly in accordance with claim 19 wherein said second sheaths support said top horizontal rail.

25. A guardrail assembly in accordance with claim 24 wherein said stanchion posts are threaded for receiving said setscrews.

26. A guardrail assembly in accordance with claim 25 wherein said top plastic pipe and said first and second plastic sheaths are formed from high density polyethylene.

27. A guardrail assembly in accordance with claim 26 wherein said top metal pipe, said first metal pipe and said stanchion posts and bases are formed from a metal selected from the group including steel, aluminum, and iron.

28. A rail assembly comprising:
a vertical stanchion;
at least one horizontal, tubular rail having a hollow interior, said rail defining an aperture, said stanchion extending into said aperture; and
an extendable/retractable member on said stanchion for reversibly locking said tubular rail to said stanchion, said member being positioned on said stanchion so that it may be extended into said hollow interior of said rail and prevent removal of said stanchion through said aperture, said member being positioned on said stanchion so that it remains accessible from outside said rail assembly through said hollow interior of said rail for extension and retraction of said member after placement of said rail on said stanchion.

29. A rail assembly as defined by claim 28 wherein said tubular rail is reversibly locked on top of said stanchion.

30. A guardrail assembly in accordance with claim 29 wherein said member is positioned on said stanchion so that said member can be extended into said hollow interior of said rail without contacting said rail.

* * * * *